(12) United States Patent  (10) Patent No.: US 8,869,628 B2
Neuburger et al.  (45) Date of Patent: Oct. 28, 2014

(54) MAGNETIC CIRCUIT DEVICE FOR A MAGNETIC-INDUCTIVE FLOW METER

(75) Inventors: Stefan Neuburger, Stadecken-Elsheim (DE); Chris Paul, Rotterdam (NL); Jef Neven, Mours St. Eusébe (FR)

(73) Assignee: Krohne AG, Basel (CH)

( * ) Notice: Subject to any disclaimer, the term of this patent is extended or adjusted under 35 U.S.C. 154(b) by 235 days.

(21) Appl. No.: 13/576,272

(22) PCT Filed: Jan. 20, 2012

(86) PCT No.: PCT/EP2012/000261
§ 371 (c)(1),
(2), (4) Date: Jul. 31, 2012

(87) PCT Pub. No.: WO2012/098007
PCT Pub. Date: Jul. 26, 2012

(65) Prior Publication Data
US 2012/0297892 A1  Nov. 29, 2012

(30) Foreign Application Priority Data
Jan. 20, 2011  (DE) .......................... 10 2011 009 062

(51) Int. Cl.
*G01F 1/58* (2006.01)
(52) U.S. Cl.
CPC ..................................... *G01F 1/586* (2013.01)
USPC ..................................................... 73/861.12
(58) Field of Classification Search
USPC ............... 73/861.15, 861.13, 861.12, 861.16
See application file for complete search history.

(56) References Cited

U.S. PATENT DOCUMENTS

| 3,446,071 | A |   | 5/1969 | Kolin et al. |
| 3,504,541 | A |   | 4/1970 | Birnstingl |
| 4,470,309 | A |   | 9/1984 | Wada |
| 4,727,755 | A |   | 3/1988 | Schmoock |
| 4,932,268 | A |   | 6/1990 | Hafner |
| 5,337,607 | A | * | 8/1994 | Brown ....................... 73/861.12 |
| 5,398,553 | A | * | 3/1995 | Hemp ........................ 73/861.15 |
| 5,544,532 | A | * | 8/1996 | Brown ....................... 73/861.16 |
| 5,767,418 | A |   | 6/1998 | Davis |

(Continued)

FOREIGN PATENT DOCUMENTS

| DE |      30 06 723 A1 | 4/1981 |
| DE | 10 2004 019 189 B3 | 8/2005 |

(Continued)

*Primary Examiner* — Jewel V Thompson
(74) *Attorney, Agent, or Firm* — Roberts Mlotkowski Safran & Cole, P.C.; David S. Safran

(57) ABSTRACT

A magnetic circuit device (1) for implementing the magnetic circuit of a magnetic-inductive flow meter (12) has at least one coil (2b) which generates a magnetic field, at least two opposing flat pole elements (3a, 3b), between which, in the installed state, the measurement tube (13) of the magnetic-inductive flow meter is located, and with at least one magnetically conductive connecting element (4a, 4b) for magnetic closure of the magnetic circuit. The cross section of the core (2a) of the coil (2) and/or of the magnetically conductive connecting elements (4a, 4b) is as small as possible. Preferably, the magnetically conductive connecting element or the magnetically conductive connecting elements (4a, 4b) are arc-shaped so that the resulting magnetic circuit device (1) has a ring-shaped outer contour and extensively encompasses at least one of the flat pole elements (3a, 3b).

18 Claims, 9 Drawing Sheets

(56) References Cited

U.S. PATENT DOCUMENTS

| | | |
|---|---|---|
| 6,094,992 A * | 8/2000 | Mesch et al. ............... 73/861.15 |
| 6,237,424 B1 | 5/2001 | Salmasi et al. |
| 7,788,046 B2 * | 8/2010 | Schmalzried et al. .......... 702/45 |
| 7,798,015 B2 * | 9/2010 | Zingg et al. ................. 73/861.12 |
| 7,908,932 B2 | 3/2011 | Magliocca et al. |
| 7,992,451 B2 | 8/2011 | Ehrenberg et al. |

FOREIGN PATENT DOCUMENTS

| | | |
|---|---|---|
| DE | 10 2004 063 020 A1 | 7/2006 |
| DE | 10 2009 001 413 A1 | 9/2010 |
| EP | 0 183 859 A1 | 6/1986 |
| EP | 1 674 836 A1 | 6/2006 |

* cited by examiner

MAGNETIC CIRCUIT DEVICE FOR A MAGNETIC-INDUCTIVE FLOW METER

BACKGROUND OF THE INVENTION

1. Field of the Invention

The invention relates to a magnetic circuit device for implementing the magnetic circuit of a magnetic-inductive flow meter, having at least one coil which has a coil core and which generates a magnetic field, with at least two opposing flat pole elements between which, in the installed state of the magnetic circuit device, the measurement tube of the magnetic-inductive flow meter is located in the flow meter, and having at least one magnetically conductive connecting element for magnetic closure of the magnetic circuit. Moreover, the invention also relates to a magnetic-inductive flow meter with at least one measurement tube, with at least one magnetic circuit device for implementing the magnetic circuit and with at least two electrodes for detecting a measurement voltage, the magnetic circuit device having at least one coil which has a coil core and which generates a magnetic field, at least two opposite flat pole elements between which the measurement tube is located, and at least one magnetically conductive connecting element for magnetic closure of the magnetic circuit.

2. Description of Related Art

It is recognized that there are no "open magnetic fields" but only "closed magnetic circuits". Therefore, by stating that there is at least one magnetically conductive connecting element for magnetic closure of the magnetic circuit, this magnetically conductive connecting element is part of the magnetic circuit, and therefore the part of the magnetic circuit which leads to its actually being a closed magnetic circuit.

Generating a magnetic field in the measurement tube of a magnetic-inductive flow meter is essential for the implementation of the measurement principle which is based on the separation of moving charges in a magnetic field. The measurement engineering basis is formed by a measurement tube of nonmagnetic material, for example, of a nonmagnetic metal which on the flow side is electrically insulated from the measurement fluid by an insulating lining and which is penetrated perpendicular to the flow direction by a magnetic field which has been generated by the coil of the magnetic circuit device. If a measurement fluid with a minimum electrical conductivity flows through the measurement tube, the charge carriers which are present in the conductive measurement fluid are deflected by the magnetic field. On measurement electrodes which are located perpendicular to the magnetic field and to the flow direction, the charge separation yields a potential difference, therefore a voltage which is detected with a measuring instrument and is evaluated as a measurement voltage. The measurement voltage is proportional to the flow velocity of the charge carriers moved with the measurement fluid so that conclusions about the flow rate in the measurement tube can be drawn from the flow velocity.

Magnetic-inductive flow meters have the advantage that they essentially do not intrude into the flow within the measurement tube so that the flow remains undisturbed, the measurement principle easily achieving accuracies in the range of 1% of the measured value, in part even better accuracies can be achieved.

The structure of magnetic-inductive flow meters is however relatively demanding, exactly like the evaluation of the measurement signals so that magnetic-inductive flow meters have not been possible for large-scale applications from a low-cost standpoint, for example, as domestic water meters. Otherwise, a problem lies in that, to generate a magnetic field which is strong enough for a measurement between the opposite pole elements, electrical power must be continuously made available which has a considerable portion of the electrical power which is altogether necessary for operation of a magnetic-inductive flow meter. For this reason magnetic-inductive mass flow meters which are to be operated free of the power grid (do not have to be "plugged-in," for example) are difficult to implement, in any case not if maintenance-free operating times of several years are to be implemented.

SUMMARY OF THE INVENTION

The object of the invention is therefore to devise a magnetic circuit device for implementing the magnetic circuit of a magnetic-inductive flow meter which can be economically produced and which is characterized by considerably reduced power consumption so that magnetic-inductive flow meters can also be implemented with it for large scale applications free of the power grid.

This aforementioned object is achieved in the initially described magnetic circuit device in that the cross section of the coil core and/or of the magnetically conductive connecting elements is as small as possible. "As small as possible" means a dimensioning which leads to saturation not occurring. This teaching "as small as possible" can be applied to the cross section of the coil core, to the cross section of the magnetically conductive connecting elements, especially of course both to the cross section of the coil core and also to the cross section of the magnetically conductive connecting elements.

It has been recognized, first of all, in accordance with the invention, that in the known magnetic-inductive flow meters a significant part of the electrical power consumed is "lost", i.e., unused, in the magnetic stray fields. Because, in accordance with the invention, the cross section of the coil core and/or of the magnetically conductive connecting elements is as small as possible, preferably therefore the cross section of the coil core and the cross section of the magnetically conductive connecting elements are chosen such that the stray field (which can never be entirely avoided) is reduced to the extent possible with consideration of all relevant parameters.

In one preferred embodiment of the magnetic circuit device in accordance with the invention, the magnetically conductive connecting element or the magnetically conductive connecting elements are made arc-shaped so that the resulting magnetic circuit device has a ring-shaped outer contour and extensively encompasses at least one of the flat pole elements. This supplementary teaching includes the finding that typical magnetic circuit devices for magnetic-inductive flow meters have magnetically conductive connecting elements which are as closely adjacent as possible to the measurement tube of the magnetic-inductive flow meter so that different elements of known magnetic circuit devices are opposite one another with a short distance, and thus, the formation of magnetic stray fields is taken into account.

Research has shown that the stray field portion of these magnetic circuit devices which are known from the prior art can be more than 80% of the magnetic field which has been generated overall so that only a very small portion of the energy which has been expended flows at all into the useful field which is relevant to the measurement. Because the magnetically conductive connecting elements are routed such that they form a ring-shaped outer contour and extensively encompass at least one of the flat pole elements, stray fields can be largely prevented. At least one of the flat pole elements is extensively encompassed especially when the stray field portion is reduced to less than 35% of the generated magnetic field, preferably to less than 25% of the generated magnetic field.

Therefore, the above described constructions of a magnetic circuit device has been among others ignored in the prior art because a corresponding implementation at conventional nominal diameters of the measurement tube would not be acceptable since extensively surrounding the flat pole elements would greatly increase the housing dimensions of a resulting magnetic-inductive flow meter; it is noteworthy here that magnetic-inductive flow meters are produced for nominal sizes up to DN 3,000. However, it has been recognized here that for typical domestic applications in which nominal sizes of the measurement tube are only a few tens of millimeters, extensively surrounding the flat pole elements by the ring-shaped outer contour of the magnetic circuit device does not constitute a relevant limitation. Preferably, the ring-shaped outer contour is convex overall, viewed from the outside.

In one preferred embodiment of the magnetic circuit device in accordance with the invention, to implement the extensive encompassing of at least one of the flat pole elements by the ring-shaped outer contour of the magnetic circuit device, it is provided that the smallest diameter of the ring-shaped outer contour has at least 1.5 times the distance of the opposite flat pole elements. The opposite flat pole elements between which the magnetic field forms, are conventionally spaced no farther from the measurement tube than necessary, even to some extent rest on the measurement tube. Because the ring-shaped outer contour of the magnetic circuit device is provided with a diameter of at least 1.5 times the distance between the flat pole elements, it is ensured that elements of the magnetic circuit device are spaced so far from one another that the stray fields can form only to a small degree. An especially good result is achieved when the smallest diameter of the ring-shaped outer contour has roughly twice the distance of the opposing flat pole elements. This constitutes a good compromise between avoiding the stray fields and acceptable housing dimensions of the magnetic-inductive flow meter.

When stating that the magnetic circuit device has a ring-shaped outer contour, a circular ring is not narrowly meant. Rather it is essentially a ring-forming outer contour which can of course be asymmetrical and can have flattened areas in sections. When the outer contour is asymmetrical or is not strictly in the shape of a circular ring, the diameter of the ring-shaped outer contour can be defined as the distance line which runs through the surface midpoint or the surface center of gravity.

The implementation of the magnetic circuit device in accordance with the invention can be further improved in that the contour of the magnetic circuit device in the plane which is formed by the ring-shaped outer contour executes direction changes at an angle of at least 90°, resulting in that acute angles cannot form in the magnetic circuit and aside from the pole elements magnetic circuit elements are not directly opposite one another; in this way, stray field losses can likewise be minimized. Direction changes mean especially sudden direction changes, since for the required arc-shaped configurations of the connecting elements it is ensured anyway that direction changes are carried out gradually, avoiding parts which route the magnetic field approaching one another.

In another advantageous embodiment of the magnetic circuit device in accordance with the invention, the coil is made as a cylindrical coil, especially with a length/diameter ratio greater than 4, preferably greater than 5. Thus, a very homogenous magnetic field can be produced with low loss, especially when the coil is orthocyclically wound. Preferably, the turns of the coil are wound directly onto the coil core so that the required magnetic flux can be generated with a coil which, compared to conventionally voluminous coils, has a much smaller self-inductance and a much smaller ohmic resistance; this further reduces the require power consumption for generating the desired useful magnetic field.

Preferably, the structural elements which form the magnetic circuit device are located in one plane, the magnetic circuit device essentially not extending perpendicular to this plane, aside from the pole elements which are, of course, also extended perpendicular to the plane of extension in which the connecting elements are formed so that a relatively three-dimensionally extended magnetic field can be produced in order to be able to cause a deflection effect which can be evaluated using measurement technology when the charges are moving. Preferably, it is provided that the coil projects radially into the inner region of the ring-shaped outer contour of the magnetic circuit device, the coil therefore also lies in the essential plane of extension of the magnetic circuit device. In this way, it can be especially easily implemented that, in the transition region from the coil to the annular outer contour of the magnetic circuit device which is formed by the conductive connecting elements, there is at least one 90° angle; this has an advantageous effect on the reduced formation of stray fields.

In one quite preferred embodiment of the magnetic circuit device in accordance with the invention, it is provided that a first magnetically conductive connecting element is connected to a narrow side of a first pole element, a second magnetically conductive connecting element is connected to the opposite narrow side of the first pole element, and the first connecting element, the second connecting element and the first pole element which is connected to the two connecting elements together form a ring-shaped magnetic circuit element which then defines the ring-shaped outer contour of the magnetic circuit device. This ring-shaped magnetic circuit element can be produced especially advantageously in one piece.

One especially advantageous design is achieved when the free ends of the first connecting element and of the second connecting element, which ends are not connected to the first pole element approach one another over and away from the flat side of the first pole element with the formation of a ring gap in the ring-shaped magnetic circuit device. This is mainly advantageous for the mounting of the magnetic circuit device in a magnetic-inductive flow meter which is intended for this purpose, since depending on the material thickness of the first pole element and of the two connecting elements the connecting elements can then be bent up as the ring gap is opening and can be placed around the measurement tube so that the magnetic circuit device can be essentially installed in any mounting state of the magnetic-inductive flow meter as long as the flow meter is not completely closed by a housing. This is especially advantageous if it is considered that the measurement tube of magnetic-inductive flow meters in the region of the pole elements can be shaped differently in cross section and periphery than in the region of the ends and connection pieces of the measurement tube so that often it is not easily possible to introduce a measurement tube between the pole elements of a magnetic circuit device.

In conjunction with the what was explained above, it has also been found to be advantageous if the coil, a pole element which is located on one end of the coil and a coupling element which is located on the other end of the coil form a radial magnetic circuit element and the coupling element is made such that it can be connected to the free ends of the connecting elements, especially specifically to the free ends of the connecting elements of the above described ring-shaped magnetic circuit element. In this way, the ring-shaped magnetic circuit element can be easily pre-mounted and the radial magnetic circuit element in the assembly of a magnetic-inductive flow meter can be easily combined into a complex magnetic circuit device by joining together. This simple manner of production makes it possible to greatly reduce the production costs of a magnetic-inductive flow meter which uses the magnetic circuit device in accordance with the invention so that these magnetic-inductive flow meters can also be of interest to the mass market.

The object of the invention in the initially described magnetic-inductive flow meter is achieved in that the magnetic circuit device for implementing the magnetic circuit is a magnetic circuit device as has been described above. The magnetic circuit device in accordance with the invention is not only inherently advantageous, but in particular mainly in conjunction with a magnetic-inductive flow meter; this results solely from the fact that this magnetic-inductive flow meter can thus be easily operated even with a small operating voltage and with a low electrical power, and is thus, for example, is suitable for use as a domestic water meter, also as a mass produced product for individual households.

When a magnetic-inductive flow meter for connection to lines with nominal widths of a few tens of millimeters is implemented with the magnetic circuit device suitable, in accordance with the invention, for example, an operating voltage of less than three volts is sufficient so that the operating voltage can be obtained from commercial batteries. Therefore, it is not necessary to produce a higher operating voltage at a relatively low battery voltage, as is conventionally the case in known magnetic-inductive flow meters in which operating voltages of several dozen volts are used, for example, fifty volts. The low operating voltage also has the advantage that the otherwise necessary insulation measures on the coil can also be omitted since only low power and associated energy is necessary anyway. It is also important mainly that shielding between the coil and electrodes is not necessary.

For the magnetic circuit device in accordance with the invention and for the magnetic-inductive flow meter in accordance with the invention, the possible low resistance and the possible low inductance of the coil are also advantageous. This is associated with the possibility of bringing the transient recovery time, even at an operating voltage less than three volts, to less than one millisecond; this is in turn advantageous for the energy consumption.

In particular, there are numerous possibilities for embodying and developing the magnetic circuit device in accordance with the invention. Reference is made in this respect to the detailed description of preferred exemplary embodiments in conjunction with the accompanying drawings.

DETAILED DESCRIPTION OF THE INVENTION

Figure 1:
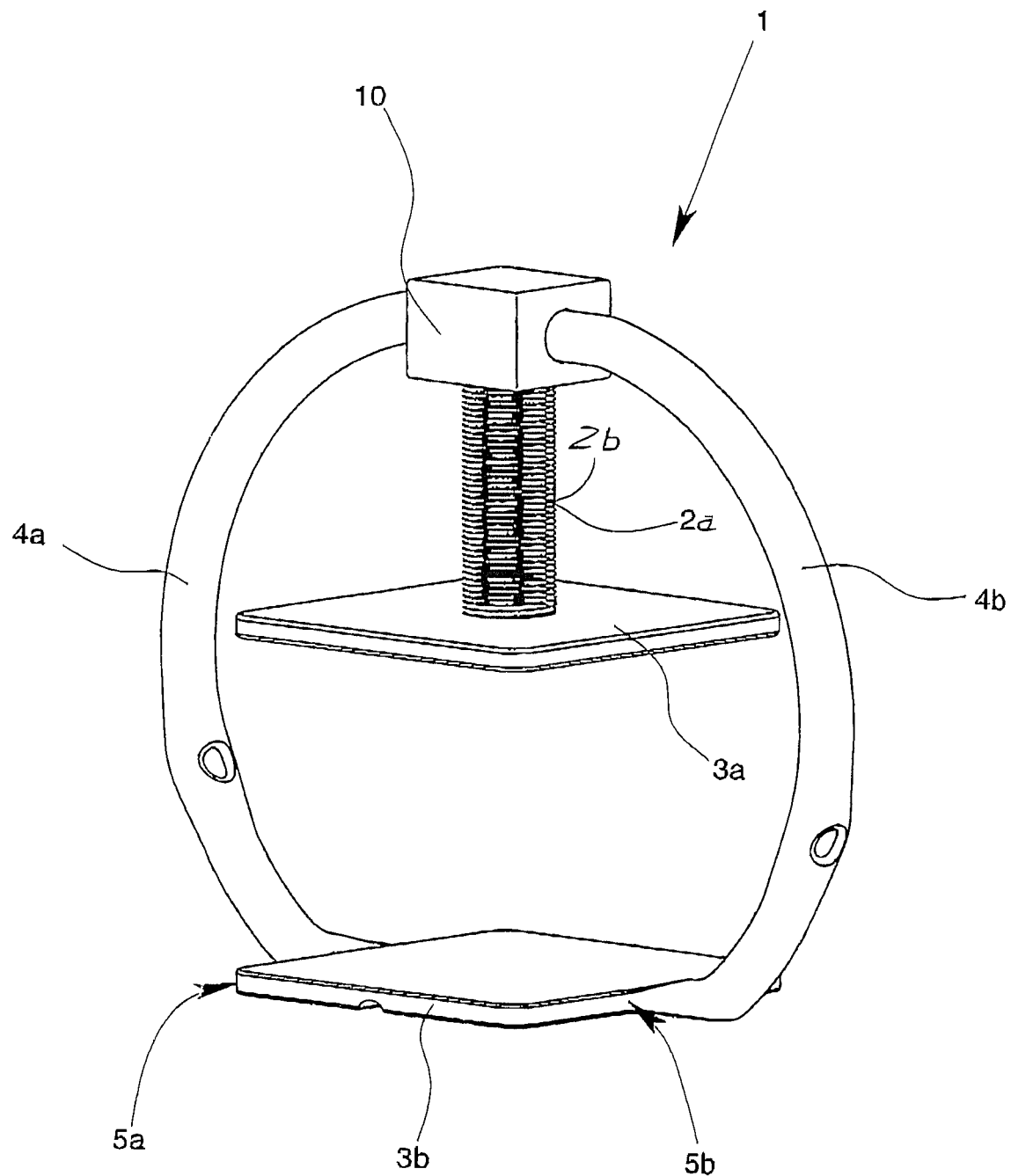
FIG. 1 is a perspective view an exemplary embodiment of a magnetic circuit device in accordance with the invention.

FIG. 1 shows, first of all, a magnetic circuit device 1 in accordance with the invention which is intended for a magnetic-inductive flow meter 12 and which is used to implement a magnetic circuit. The magnetic field is generated by the coil 2b which has a coil core 2a, the magnetic field also propagating between the two opposing flat pole elements 3a, 3b so that a measurement tube 13 provided between the opposite flat pole elements 3a, 3b is flooded by a magnetic field essentially perpendicular to the flow direction so that charge carriers are deflected in the manner necessary for measurement. There are also magnetically conductive connecting elements 4a, 4b with which the magnetic circuit is closed.

The cross section of the core 2a of the coil 2b and of the magnetically conductive connecting elements 4a, 4b is as small as possible. What is meant by this and what is achieved with this will be explained below.

In order to produce a magnetic stray field as small as possible, the magnetically conductive connecting elements 4a, 4b are made arc-shaped so that the resulting magnetic circuit device 1 has a ring-shaped contour and extensively surrounds one of the flat pole elements 3a, 3b—in this case, the pole element 3a. The illustrated "extensive surrounding" of at least one of the pole elements 3a, 3b leads to as few elements as possible of the magnetic circuit device 1 being opposite one another in the immediate vicinity so that the intensity of the essentially inevitable stray fields is greatly reduced compared to the magnetic circuit devices known from the prior art. Since the proportion of the stray field is small, a large part of the expended energy of generating the entire magnetic field can be used for the useful magnetic field between the pole elements 3a, 3b.

Figure 2:
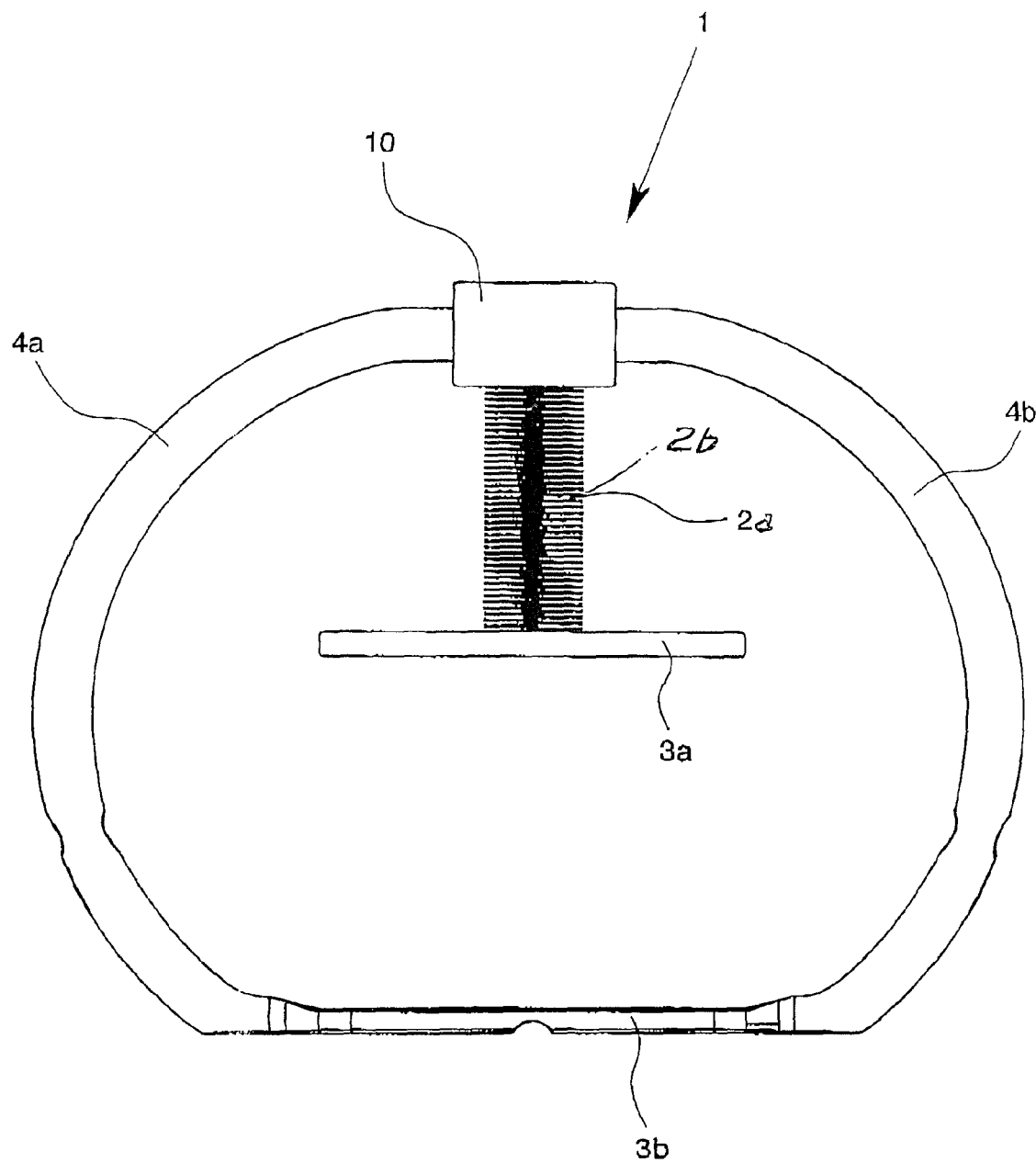
FIGS. 2-4 are, respectively a front view, a plan view and a side view showing the exemplary embodiment of FIG. 1.
Figure 3:
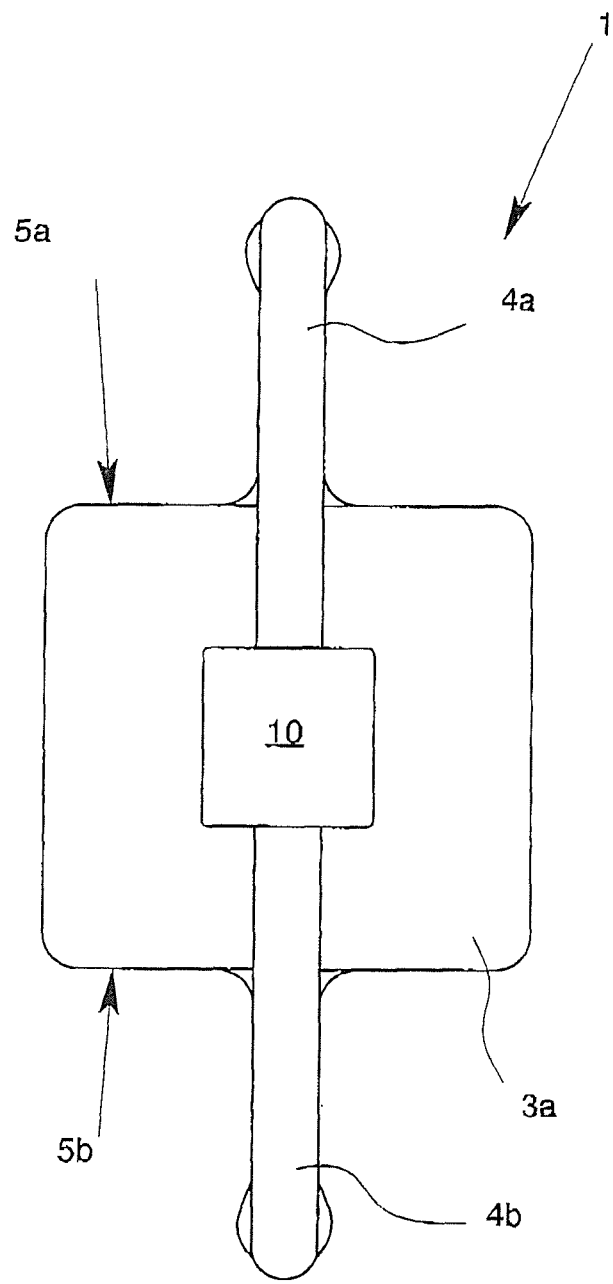
Figure 4:
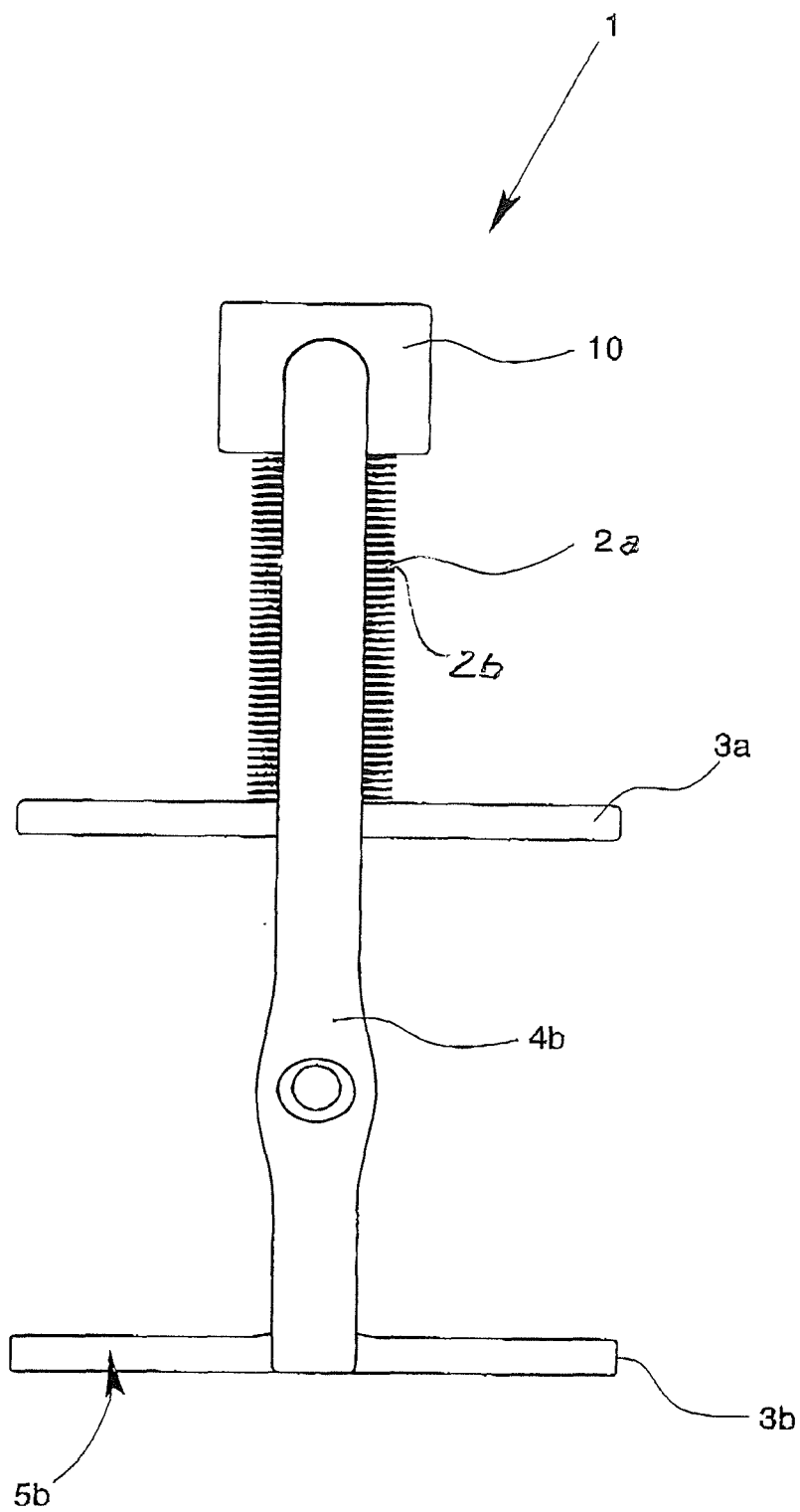

The magnetically conductive connecting elements 4a, 4b extensively surrounding the pole element 3a can be recognized especially well in the front view according to FIG. 2. It can likewise be taken from this front view that the smallest diameter of the ring-shaped outer contour of the magnetic circuit device 1 corresponds roughly to twice the distance of the opposing surfaces of the pole elements 3a, 3b. This dimensioning together with the arc-shaped configuration of the magnetically conductive connecting elements 4a, 4b ensures sufficient distances of the elements of the magnetic circuit device 1 relative to one another. The front view according to FIG. 2 also shows that sudden changes of the contour of the magnetic circuit device 1 in the plane formed by the ring-shaped outer contour are carried out at an angle of roughly 90°, the contour of the magnetic circuit also being formed by the coil 2b which projects radially into the inner region of the ring-shaped outer contour. The coil 2b is directly adjacent to the pole element 3a and stands vertically on its pole surface so that here direction changes in the contour are likewise implemented at an angle of at least 90°.

The magnetic circuit devices which are shown in the figures all have coils 2b which have a length/diameter ratio of barely over 4, but also over 5, and whose turns are orthocyclically wound so that a sufficient field intensity can be implemented with comparatively few turns at low currents.

In order to be able to generate an effective magnetic field over a certain measurement distance, the flat pole elements 3a, 3b have a longitudinal extension of roughly half the maximum diameter of the ring-shaped outer contour in the plane of the ring-shaped outer contour of the magnetic circuit device 1. In the illustrated exemplary embodiment the pole elements 3a, 3b are made flat and since the illustrated magnetic circuit device 1 is also intended to be used in a measurement tube 13 whose flow channel is flattened in the region of the flooding of the magnetic field, here specifically in the region of the flat pole elements 3a, 3b.

Figure 5:
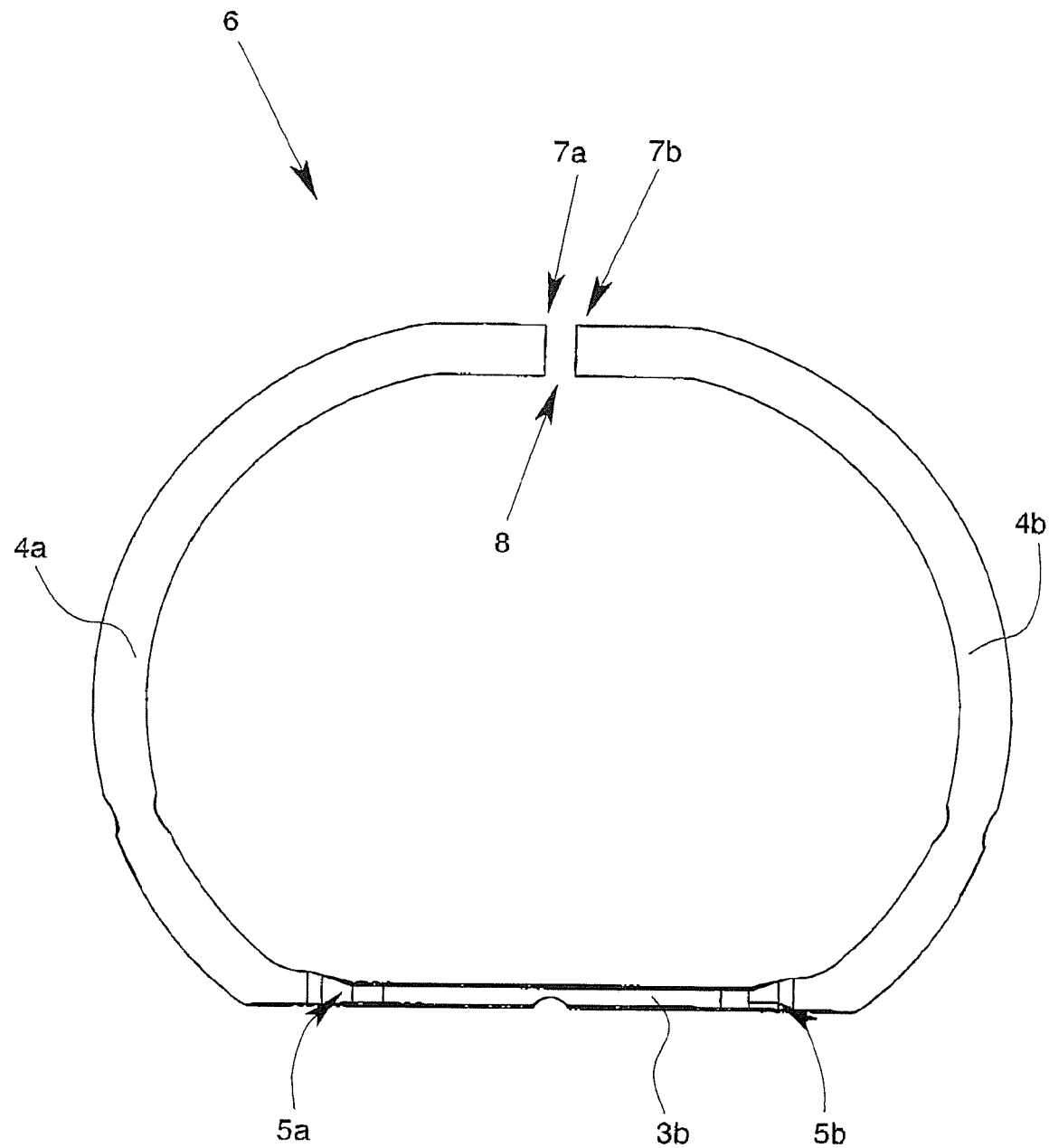
FIG. 5 shows part of the magnetic circuit device according to FIGS. 1-4 in the form of a ring-shaped magnetic circuit element.

The front view according to FIG. 5 shows that a first magnetically conductive connecting element 4a is connected to one narrow side 5a of a first pole element 3b and a second magnetically conductive connecting element 4b is connected to the opposite narrow side 5b of the first pole element 3b. Here, the first connecting element 4a, the second connecting element 4b and the first pole element 3b form a ring-shaped magnetic circuit element 6 which defines the ring-shaped outer contour of the magnetic circuit device 1, the ring-shaped magnetic circuit element 6 being made in one piece. In the illustrated exemplary embodiment the ring-shaped magnetic circuit element 6 has been obtained by metal injection molding. Here, the material is the iron-nickel alloy FeNi50.

FIG. 5 likewise shows that the free end 7a of the first connecting element 4a which is not connected to the first pole element 3b and the free end 7b of the second connecting element 4b which is not connected to the first pole element 3b approach one another over and away from the flat side of the first pole element 3b with the formation of a ring gap 8. When this ring-shaped magnetic circuit element 6 is made elastic enough, it is possible to bend the magnetic circuit element 6 during mounting and to guide it around the measurement tube 13 of the resulting magnetic-inductive flow meter 12 where it can then be positioned. The ring-shaped magnetic circuit element 6 can be especially easily used mainly with the radial magnetic circuit element 9 which is shown in FIGS. 6, 7A and 7B.

Figure 6:
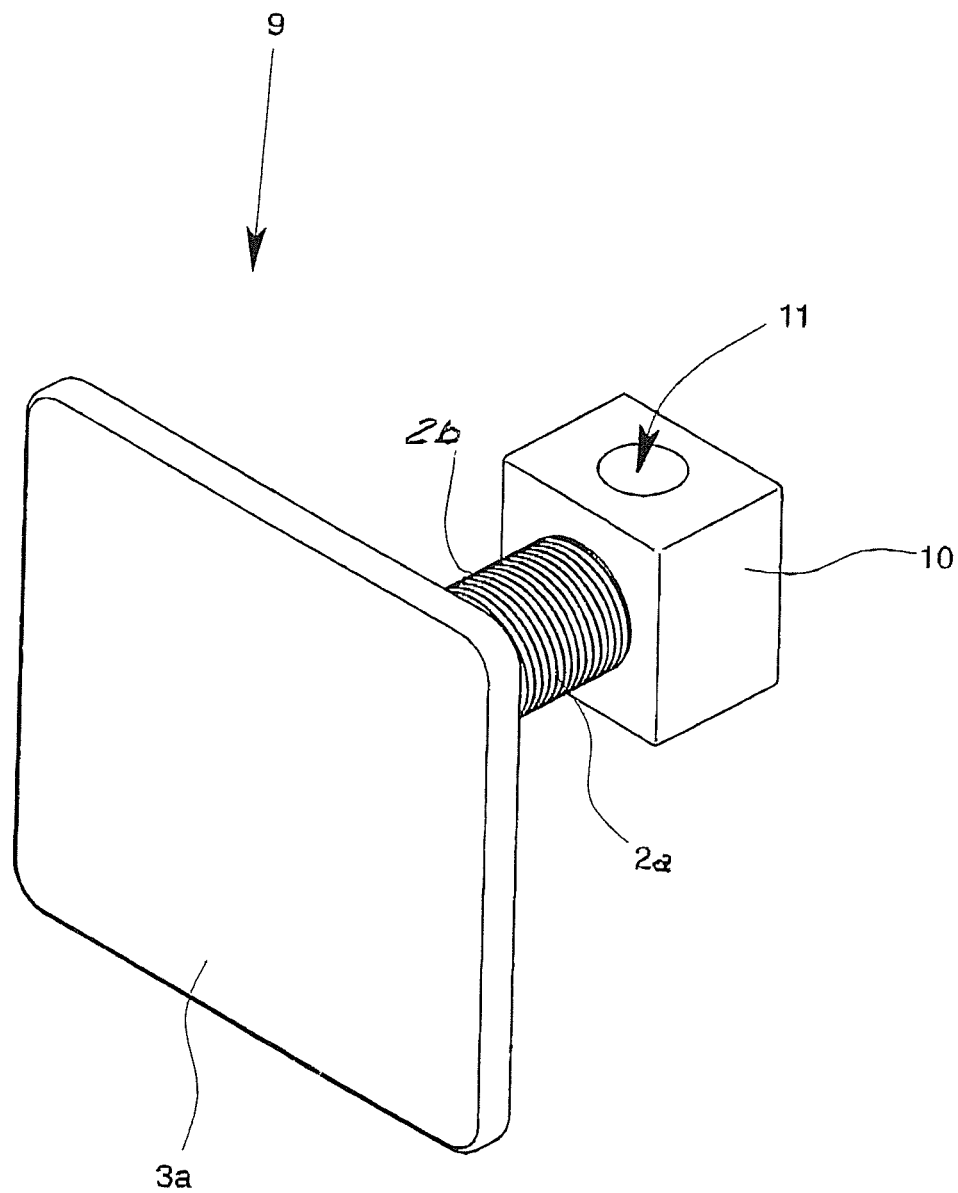
FIG. 6 is a perspective showing another part of the magnetic circuit device as shown in FIGS. 1-4 in the form of a radial magnetic circuit element.
Figure 7A:
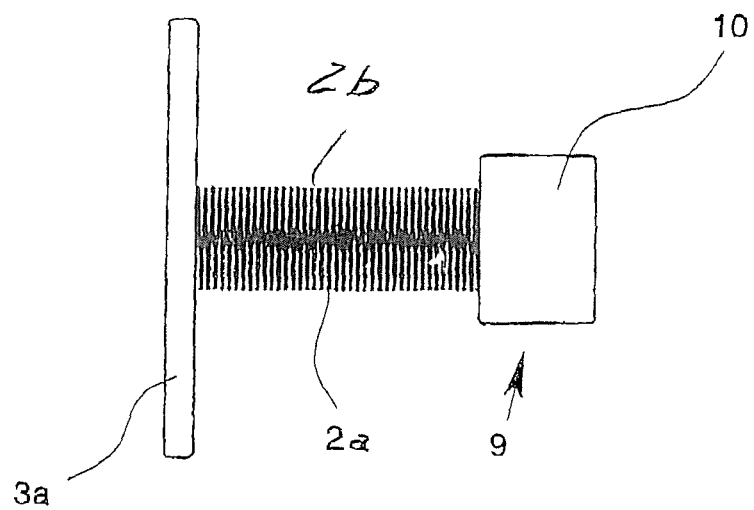
FIGS. 7A & 7B are side and plan views of the part shown in FIG. 6.
Figure 7B:
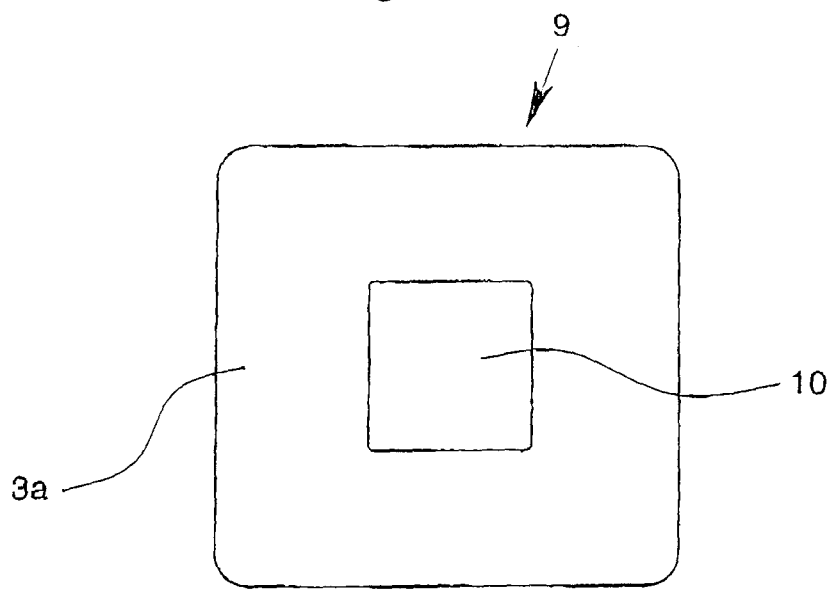

The "radial" magnetic circuit element 9 which is shown in FIGS. 6, 7A and 7B is formed from the coil 2b, the pole element 3a which is located on one end of the coil 2b, and a coupling element 10 which is located on the other end of the coil 2b. The coupling element is made such that it can be connected to the free ends 7a, 7b of the connecting elements 4a, 4b (see, FIG. 5). This is achieved by the coupling element 10 having at least one recess 11 into which the connecting elements 4a, 4b can be inserted. When the magnetic circuit device 1 is assembled from the prefabricated modules, ring-shaped magnetic circuit element 6 and radial magnetic circuit element 9, final assembly is especially easily and therefore economically possible.

With respect to the exemplary embodiment described so far, it is emphasized that only a single coil 2b is used as compared to the otherwise known implementations of magnetic circuits in which two coils are conventionally used, one coil each per pole element. It has been found that very good measurement results can also be achieved with a magnetic field which has been generated by a first coil in the indicated manner; this contributes greatly to reducing costs in production and to reducing the power consumption during operation.

Figure 8:
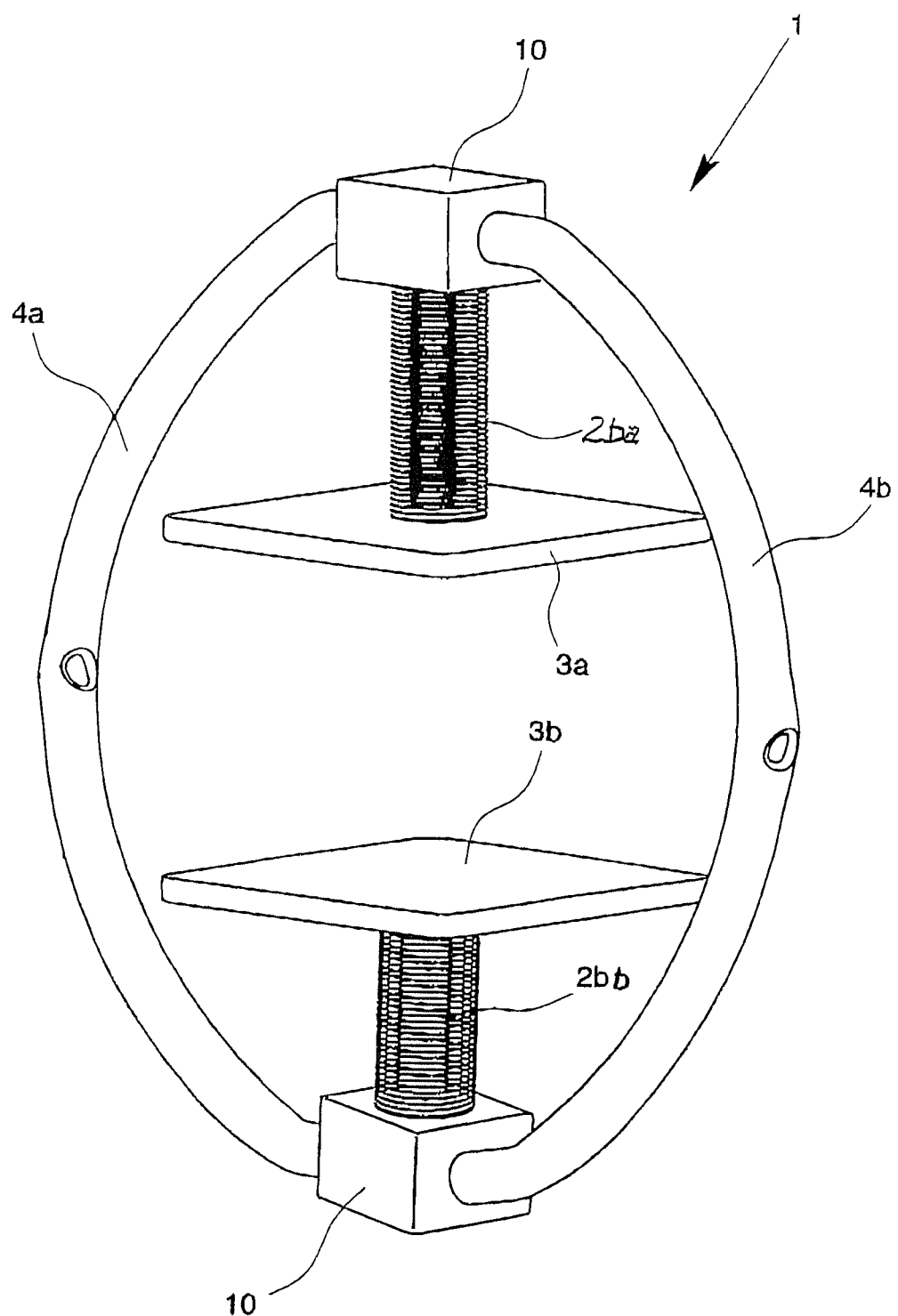
FIG. 8 shows another exemplary embodiment of a magnetic circuit device in accordance with the invention.

FIG. 8 shows another exemplary embodiment which differs from the above described embodiment in that, instead of using only the single coil 2b, two coils 2ba and 2bb are used so that this magnetic circuit device 1 essentially symmetrically surrounds a measurement tube 13 of a magnetic-inductive flow meter. However, this version does not have the advantage that using only a single coil 2b has in that it cannot be produced as economically.

The magnetic circuit device shown in FIGS. 1 to 7B is intended especially for use with a magnetic-inductive flow meter 12 for connection to lines with a nominal diameter of a few tens of millimeters, as occur, for example, in household installations. The flat pole elements 3a, 3b are spaced roughly twelve millimeters apart and the connecting elements 4a, 4b are rod-shaped and have a diameter of roughly 1.7 millimeters so that they are, generally, very elastic so that the connecting elements 4a, 4b can be easily sufficiently elastically bent if there is a gap 8 on their free ends. The smallest diameter of the ring-shaped outer contour of the magnetic circuit device 1 here measures roughly twenty millimeters and the opposite surfaces of the pole elements 3a, 3b have a size of roughly 170 $mm^2$, the surfaces being square in their basic shape. The coil 2b has a length/diameter ratio roughly greater than 4, possibly also roughly greater than 5, the coil windings having an ohmic resistance of roughly 5 ohms. With these boundary conditions, currents which generate a magnetic field which is sufficient for flow measurement can be produced with a coil voltage of less than 100 mV.

Conventional magnetic-inductive flow meters which have much higher stray losses must operate with much higher voltages in order to be able to produce sufficient current intensities. The described magnetic circuit element 1 leads to magnetic-inductive flow meters being able to be implemented which can be used, for example, for flow measurement in the domestic environments, which are battery-operated and which have a service life of up to 20 years at a measurement frequency of roughly one measurement per second.

Figure 9:
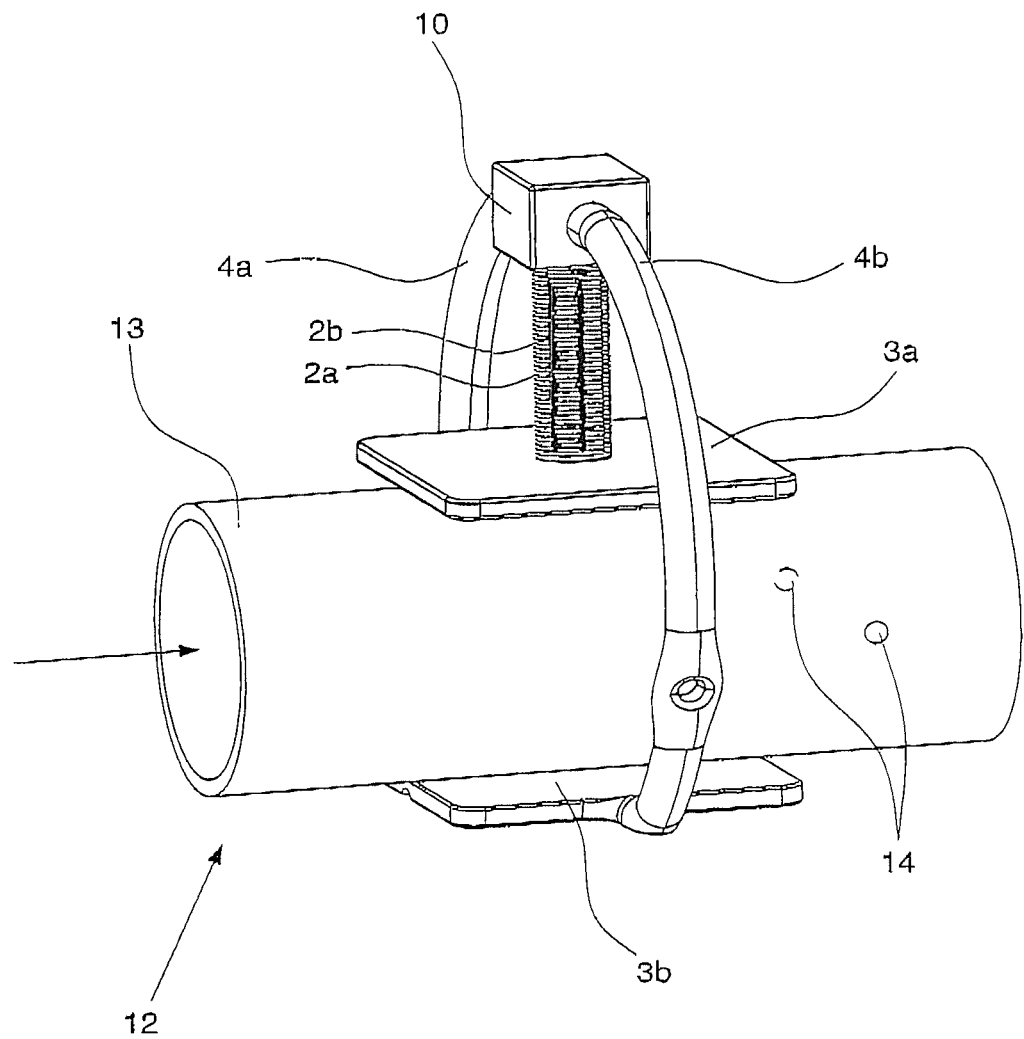
FIG. 9 is a perspective view of an exemplary embodiment of a magnetic-inductive flow meter in accordance with the invention.

FIG. 9 shows a magnetic-inductive flow meter 12 in accordance with the invention having the magnetic circuit device 1 described above, a measurement tube 13 and two electrodes 14 for detecting the deflected charge carriers. The measurement tube 13 is provided between the opposed flat pole elements 3a, 3b and is flooded by the magnetic field essentially perpendicular to the flow direction so that the charge carriers are deflected. The deflected charge carriers are detected by the electrodes which are arranged opposite each other and perpendicular to the flow direction and to the magnetic field direction in the wall of the measurement tube 13.

What is claimed is:

1. A magnetic circuit device for implementing a magnetic circuit of a magnetic-inductive flow meter, comprising:
   at least one coil and coil core for generating a magnetic field,
   at least two opposing flat pole elements between which a measurement tube of the magnetic-inductive flow meter is located in an installed state of the circuit device in a magnetic-inductive flow meter, and
   at least one magnetically conductive connecting element for magnetic closure of the magnetic circuit between the pole elements,
   wherein at least one of the core and the at least one magnetically conductive connecting element has a cross section that is as small as possible without leading to saturation.

2. The magnetic circuit device as claimed in claim 1, wherein the at least one magnetically conductive connecting element is arc-shaped so that the resulting magnetic circuit device has a ring-shaped outer contour and extensively encompasses at least one of the flat pole elements.

3. The magnetic circuit device as claimed in claim 2, wherein a smallest diameter of the ring-shaped outer contour of the magnetic circuit device is at least 1.5 times the spacing of the opposing flat pole elements.

4. The magnetic circuit device as claimed in claim 2, wherein a smallest diameter of the ring-shaped outer contour of the magnetic circuit device is at least at least twice the spacing of the opposing flat pole elements.

5. The magnetic circuit device as claimed in claim 2, wherein the contour of the magnetic circuit device in a plane formed by the ring-shaped outer contour at an angle of at least 90° relative to the flat pole elements.

6. The magnetic circuit device as claimed in claim 1, wherein the coil is a cylindrical coil with a length/diameter ratio greater than 4.

7. The magnetic circuit device as claimed in claim 1, wherein the coil is a cylindrical coil with a length/diameter ratio greater than 5.

8. The magnetic circuit device as claimed in claim 1, wherein the coil is directly adjacent to one of the pole elements and vertically oriented on a pole surface thereof.

9. The magnetic circuit device as claimed in claim 2, wherein the coil projects radially into an inner region of the ring-shaped outer contour of the magnetic circuit device.

10. The magnetic circuit device as claimed in claim 1, wherein the flat pole elements have a longitudinal extension in the plane of the ring-shaped outer contour of the magnetic circuit device that is from 40% to 60% of the maximum diameter of the ring-shaped outer contour of the magnetic circuit device.

11. The magnetic circuit device as claimed in claims 1, wherein opposing surfaces of the pole elements are made flat and extend parallel to one another.

12. The magnetic circuit device as claimed in claims 1, wherein the at least one magnetically conductive connecting element comprises first and second magnetically conductive connecting elements, wherein the first magnetically conductive connecting element is connected to a narrow side of a first of the opposing flat pole elements, the second magnetically conductive connecting element is connected to an opposite narrow side of the first of the opposing flat pole elements, and the first connecting element, the second connecting element and the first pole element form a substantially ring-shaped magnetic circuit element which defines the ring-shaped outer contour of the magnetic circuit device.

13. The magnetic circuit device as claimed in claim 10, further comprising a pole element located on one end of the coil and a coupling element located on the other end of the coil, wherein the coil, the a pole element and the coupling element form a radial magnetic circuit element, and wherein the coupling element is connectable to free ends of the connecting elements of the ring-shaped magnetic circuit element.

14. The magnetic circuit device as claimed in claim 1, wherein the flat pole elements are spaced 10 mm to 14 mm apart, and the connecting elements are rod-shaped with a diameter of from 1.5 mm to 2.5 mm and a smallest diameter of the ring-shaped outer contour of the magnetic circuit device is between 15 mm and 25 mm, and opposing surfaces of the pole elements have an area between 100 $mm^2$ and 300 $mm^2$, and the coil has a length from 8 mm to 12 mm, and a coil winding of the coil has an ohmic resistance of at most 12 ohms.

15. Magnetic-inductive flow meter, comprising:
at least one measurement tube,
at least one magnetic circuit device for implementing a magnetic circuit, and
at least two electrodes for detecting a measurement voltage,
at least one coil for generating a magnetic field,
at least two opposed flat pole elements between which the measurement tube is located, and
at least one magnetically conductive connecting element for magnetic closure of the magnetic circuit between the pole elements,
wherein at least one of the core and the at least one magnetically conductive connecting element has a cross section that is as small as possible without leading to saturation.

16. Magnetic-inductive flow meter according to claim 15, wherein the at least one magnetically conductive connecting element is arc-shaped so that the resulting magnetic circuit device has a ring-shaped outer contour and extensively encompasses at least one of the flat pole elements.

17. Magnetic-inductive flow meter according to claim 16, wherein the at least one magnetically conductive connecting element comprises first and second magnetically conductive connecting elements, wherein the first magnetically conductive connecting element is connected to a narrow side of a first of the opposing flat pole elements, the second magnetically conductive connecting element is connected to an opposite narrow side of the first of the opposing flat pole elements, and the first connecting element, the second connecting element and the first pole element form a substantially ring-shaped magnetic circuit element which defines the ring-shaped outer contour of the magnetic circuit device.

18. The magnetic circuit device as claimed in claim 2, wherein the at least one magnetically conductive connecting element comprises first and second magnetically conductive connecting elements, each of which is connected to a respective one of opposite sides of one of the at least two opposing flat pole elements, and wherein the arc shape has a gap opposite the one of the poles which is connected to the first and second magnetically conductive connecting elements, wherein the gap is expandable for placement of the magnetically conductive connecting element around a measuring tube in a mounted state, and wherein a connector is provided for connecting opposed ends of the first and second magnetically conductive connecting elements so as to form a ring shape in the mounted state.

* * * * *